United States Patent
Siegemund et al.

(10) Patent No.: US 11,093,762 B2
(45) Date of Patent: Aug. 17, 2021

(54) METHOD FOR VALIDATION OF OBSTACLE CANDIDATE

(71) Applicant: Aptiv Technologies Limited, St. Michael (BB)

(72) Inventors: Jan Siegemund, Cologne (DE); Christian Nunn, Huckeswagen (DE)

(73) Assignee: Aptiv Technologies Limited, St. Michael (BB)

( * ) Notice: Subject to any disclaimer, the term of this patent is extended or adjusted under 35 U.S.C. 154(b) by 37 days.

(21) Appl. No.: 16/406,356

(22) Filed: May 8, 2019

(65) Prior Publication Data
US 2019/0362163 A1   Nov. 28, 2019

(30) Foreign Application Priority Data
May 28, 2018   (EP) ..................... 18174495

(51) Int. Cl.
*G06K 9/00* (2006.01)
*G06T 7/11* (2017.01)
(Continued)

(52) U.S. Cl.
CPC ....... *G06K 9/00805* (2013.01); *G06K 9/3233* (2013.01); *G06K 9/6269* (2013.01);
(Continued)

(58) Field of Classification Search
CPC ............. G06K 9/00805; G06K 9/3233; G06K 9/6269; G06K 9/6202; G06K 9/6211;
(Continued)

(56) References Cited

U.S. PATENT DOCUMENTS 9,251,708 B2 * 2/2016 Rosenbaum ........... G08G 1/165
10,275,668 B1 * 4/2019 Nuernberger .......... G05D 1/101
(Continued)

FOREIGN PATENT DOCUMENTS

DE     10 2016 218853 A1   3/2018
EP         2 993 654 A1   3/2016

OTHER PUBLICATIONS

Pundlik Shrinival et al: "Time to Collision and Collision Risk Estimation from Local Scale and Motion", Sep. 26, 2011, pp. 728-737.
(Continued)

*Primary Examiner* — Dhaval V Patel
(74) *Attorney, Agent, or Firm* — Colby Nipper PLLC

(57) ABSTRACT

A method for validation of an obstacle candidate identified within a sequence of image frames comprises the following steps: A. for a current image frame of the sequence of image frames, determining within the current image frame a region of interest representing the obstacle candidate, dividing the region of interest into sub-regions, and, for each sub-region, determining a Time-To-Contact (TTC) based on at least the current image frame and a preceding or succeeding image frame of the sequence of image frames; B. determining one or more classification features based on the TTCs of the sub-regions determined for the current image frame; and C. classifying the obstacle candidate based on the determined one or more classification features.

20 Claims, 3 Drawing Sheets

(51) Int. Cl.
*G06N 20/10* (2019.01)
*G06K 9/32* (2006.01)
*G06K 9/62* (2006.01)

(52) U.S. Cl.
CPC ............... *G06N 20/10* (2019.01); *G06T 7/11* (2017.01); *G06T 2207/20081* (2013.01); *G06T 2207/30261* (2013.01)

(58) Field of Classification Search
CPC .. G06K 9/00744; G06K 9/00711; G06T 7/11; G06T 2207/20081; G06T 2207/30261; G06N 20/10; G08G 1/16
See application file for complete search history.

(56) References Cited

U.S. PATENT DOCUMENTS

| | | | |
|---|---|---|---|
| 2010/0289632 | A1 | 11/2010 | Seder et al. |
| 2012/0213412 | A1 | 8/2012 | Murashita |
| 2015/0131858 | A1 | 5/2015 | Nakayama |
| 2015/0269733 | A1* | 9/2015 | Kosaki ............... G06K 9/00805 382/107 |
| 2019/0026905 | A1 | 1/2019 | Siegemund et al. |

OTHER PUBLICATIONS

Sun Zehang et al: "On-road vehicle detection: a review", May 1, 2006, pp. 697-711.
"Extended European Search Report", EP Application No. 17182718.1, dated Nov. 9, 2017, 9 pages.
"Final Office Action", U.S. Appl. No. 16/031,092, dated Apr. 3, 2020, 14 pages.
"Foreign Office Action", EP Application No. 17182718.1, dated Oct. 29, 2020, 7 pages.
"Non-Final Office Action", U.S. Appl. No. 16/031,092, dated Dec. 20, 2019, 10 pages.
Baker, et al., "Lucas-Kanade 20 Years On: A Unifying Framework", Mar. 2004, 54 pages.
Barth, et al., "Estimating the Driving State of Oncoming Vehicles From a Moving Plattorm Using Stereo Vision", Dec. 2009, pp. 560-571, 12 pages.
Geiger, "Tracking by Detection", Retrieved at: http://www.cvlibs.net/software/trackbydet/—on Jan. 8, 2021, 2 pages.
Hayward, "Near-Miss Determination Through Use of a Scale of Danger", Jan. 1972, pp. 24-35, 12 pages.
Itay, et al., "A Monocular Vision Advance Warning System for the Automotive Aftermarket SAE", Sep. 29, 2004, 8 pages.
Kim, et al., "Vision-based vehicle detection and inter-vehicle distance estimation", Oct. 2012, pp. 388-393, 6 pages.
Lebeda, et al., "Long-TermTrackingThroughFailureCases", Dec. 2013, pp. 153-160, 8 pages.
Lee, "Boosted Classifier for Car Detection", Jan. 2007, 4 pages.
Mei, et al., "Integrated Detection, Tracking and Recognition for IR Video-Based Vehicle Classification", Jan. 2006, 4 pages.
Ponsa, et al., "Cascade of Classifiers for Vehicle Detection", Aug. 2007, pp. 980-989, 10 pages.
Ross, et al., "Incremental Learning for Robust Visual Tracking", May 2008, 8 pages.
Siegemund, "Scale-KLT Vehicle Tracker", Apr. 27, 2016, 8 pages.
Spampinato, et al., "Evaluation of Tracking Algorithm Performance without Ground-Truth Data", Sep. 2012, 4 pages.
Sun, "Learning based particle filtering object tracking for visible-light systems", Oct. 2015, 25 pages.
Sun, et al., "Monocular Pre-crash Vehicle Detection: Features and Classifiers", Jun. 2006, 14 pages.
Tomasi, "Detection and Tracking of Point Features", Apr. 1991, 22 pages.
Pyo, et al., "Front Collision Warning based on Vehicle Detection using CNN", International SoC Design Conference, 2016, Oct. 2016, 2 pages.
"Foreign Office Action", EP Application No. 18174495.4, dated May 27, 2021, 6 pages.
"Foreign Office Action", CN Application No. 201810811187.1, dated May 28, 2021, 24 pages.
"Non-Final Office Action", U.S. Appl. No. 16/031,092, dated Apr. 16, 2021, 15 pages.

* cited by examiner

METHOD FOR VALIDATION OF OBSTACLE CANDIDATE

TECHNICAL

This disclosure generally relates to a method for validation of an obstacle candidate identified within a sequence of image frames.

BACKGROUND

Collision avoidance is an integral component of today's advanced driver assistance systems (ADAS). As active intervention into the driver's decision, e.g. triggering an emergency brake or an evasive maneuver, constitutes a safety critical action, particular care at situation perception and assessment is indispensable. Thus, a high level of redundancy with respect to the utilized techniques is required. This is generally strived for by using multiple sensors, such as cameras, radar and lidar sensors, to verify captured environment information and by exploiting various cues within the respective sensor algorithms.

For justification of active intervention for the purpose of collision avoidance, it is essential to judge if an observed obstacle candidate, e.g. a vehicle candidate, is a real geometric obstacle instead of a mere road or background pattern fooling the applied detection algorithm. Camera based systems generally tackle this issue based on two different cues.

First, the visual appearance of an obstacle candidate's image projection is captured and semantically evaluated using machine learning techniques, as for example, described in Junghwan Pyo and Yongjin Jeong: Front Collision Warning based on Vehicle Detection using CNN. International SoC Design Conference, 2016; Daniel Ponsa and Antonio Lopez: Cascade of Classifiers for Vehicle Detection. Advanced Concepts for Intelligent Vision Systems, 2007; David Lee: Boosted Classifiers for Car Detection. http://www.cs.cmu.edu/~dclee/, 2007; Zehang Sun et al.: Monocular Precrash Vehicle Detection: Features and Classifiers. Transaction on Image Processing, 2006; G. Kim and J. S. Cho: Vision-based vehicle detection and inter-vehicle distance estimation. International Conference on Control, Automation and Systems, 2012; Alexander Barth and Uwe Franke: Estimating the Driving State of Oncoming Vehicle from a Moving Platform Using Stereo Vision. Intelligent Transportation Systems, 2010. The quality of these classifiers majorly depends on the size of the available training data set and the expressiveness of the selected or learned classification features. They may be fooled by road or background texture mimicking the monitored obstacle class appearance.

Second, geometry information may be extracted from the image sequence via photogrammetric techniques exploiting the known camera geometry. Unfortunately, exact geometric inference from mono camera image sequences is in general infeasible if both the host vehicle and the observed object are moving. Furthermore, as long as there is no exact knowledge about the observed object's real extents (e.g. the vehicle width), only the relative position and motion of the observed object can be extracted, while the scale relative to the metric world systems remains unknown.

Fortunately, the Time-To-Contact (TTC) (cf. e.g. John Hayward: Near-miss determination through use of a scale of danger. Highway Research Record, 1972; Itay Gat et al.: A Monocular Vision Advance Warning System for the Automotive Aftermarket. SAE Technical Paper, 2005) can be estimated for moving targets without suffering the scale issue if assuming constant relative approach velocity. This is because the scale factor vanishes in the ratio of distance between host and target object and approach velocity. Analogously, the TTC can be extracted from the perspective change of the observed target pattern, i.e. from the ratio of target image size, e.g. width, and the change of that size over time, e.g. in successive image frames of a temporal sequence of sequentially captured image frames. However, computing a common TTC for the whole visible target pattern is not sufficient for obstacle candidate validation, as non-obstacle patterns such as road markings will produce a TTC as well.

SUMMARY

Described herein are techniques to provide a method for validation of an obstacle candidate identified within a sequence of image frames which is capable of efficiently and reliably distinguishing between a real obstacle and misleading underground or background structures or patterns.

The general idea the invention is based on is to test if the frame-wise deformations of the obstacle candidate's image projection correspond to geometric expectations. This test in particular relies on comparing the Times-To-Contact (TTCs) determined for different sub-regions of a region of interest which represents the obstacle candidate in the image. The TTCs are based on changes of perspective and, hence, the inventive method essentially tests whether the perspectives change differently for different sub-regions of the region of interest. A valid obstacle is assumed to be upright with respect to the line of sight of the camera the sequence of image frames is acquired with. In other words, a valid obstacle is assumed to be at least approximately fronto-parallel to the camera's image plane and, hence, to face the camera at least approximately perpendicularly to the camera's line of sight. Therefore, TTCs determined for different sub-regions of the image projection of a valid obstacle are expected to be at least approximately identical. An invalid obstacle (e.g. a pattern on the road or in the background that appears to be, but is not, a real obstacle), on the contrary, is assumed to be substantially slanted with respect to the camera's line of sight, such that different parts of the visible surface of an invalid obstacle are at differing distances from the camera. Therefore, TTCs obtained for different sub-regions of an invalid obstacle's image projection are expected to significantly differ from each other.

Given a sequence of image frames, the obstacle candidate to be validated by the method according to the invention may be identified within the sequence by any suitable method, e.g. based on pattern recognition or appearance based classification. Hence, the obstacle can in general be any kind of object which is visually identifiable. The obstacle candidate in particular is an object, such as a vehicle, that may, e.g. due to its size and position, obstruct the movement path of a host vehicle. The method by which the obstacle candidate is identified may provide a region of interest within an image frame of the sequence of image frames, in particular within the first image frame of the sequence, with the region of interest defining the part of the image frame that represents the obstacle candidate, i.e. that corresponds to the image projection of the obstacle candidate in the image frame. The sequence of image frames is in particular a temporal sequence of image frames successively captured, preferably at a constant frame rate, e.g. by a host vehicle based camera system. The sequence may be, or be derived from, a video stream.

According to the invention, the method for validation of an obstacle candidate comprises the steps A., B. and C. that are explained in the following. The method may be part of a collision warning system or some other advanced driver assistance system. In such a context, the method may support a decision for potential evasive maneuvers in subsequent higher level logics of the respective system.

Step A. of the method comprises that, for a current image frame of the sequence of image frames, a region of interest representing the obstacle candidate is determined within the current image frame, the region of interest is divided into sub-regions, and, for each sub-region, a Time-To-Contact (TTC) is determined based on at least the current image frame and a preceding or succeeding image frame of the sequence of image frames.

Ideally, the region of interest exactly corresponds to the object identified as an obstacle candidate, i.e. the region of interest includes the entire image projection of the object within the current image frame and nothing else. To this end the shape of the region of interest may be adapted to the shape of the object. However, the region of interest may also have a predetermined shape. In this case, the region of interest preferably includes the entire image projection of the object, but may also include surrounding areas. The region of interest may e.g. be defined by a bounding box, in particular of quadratic or at least rectangular shape. Within a respective image frame, the region of interest is considered to represent the obstacle candidate. The region of interest may be determined, e.g. at least for a first frame of the sequence of image frames, as a direct result from identifying the obstacle candidate. However, determining the region of interest for the current image frame may, at least for all but the first image frame, also be based on a region of interest previously determined for a respective preceding image frame, e.g. by tracking the region of interest.

Accordingly, in an advantageous embodiment of the invention, the determining of a region of interest may comprise tracking, in particular optically tracking, a region of interest representing the obstacle candidate through the sequence of image frames up to at least the current image frame, preferably through all image frames of the sequence of image frames. The region of interest is in particular tracked with respect to its position and size in each respective image frame. In general also rotations may be taken into account, though preferably they are ignored so as to reduce complexity. This is possible because rotations of an obstacle relative to a host vehicle may be negligible small or at least insignificant. For example, vertical motion can be modeled by a linear filter, the variances of which are designed to be dynamic so as to deal with rapid displacements such as those caused by cabin pitching. Horizontal motion may be assumed to embody the image projection of a two-dimensionally accelerated world motion in the horizontal domain, i.e. lateral and longitudinal motion are modeled up to the second order (i.e. position, velocity and acceleration). Tracking the region of interest representing the obstacle candidate can e.g. comprise applying the Kanade Lucas Tomasi (KLT) methodology and/or employing a Kalman filter to model relative motion of the obstacle candidate. In particular, the tracking can be executed according to methods described in European patent application no. 17 182 718.1.

After the region of interest is determined within the current image frame, it is divided into sub-regions, in particular into a predetermined number of sub-regions. Together the sub-regions preferably cover the entire region of interest. The sub-regions may in general be disjoint or contiguous, but preferably overlap. According to an advantageous embodiment of the invention, the region of interest is divided along an axis into a predetermined number of sub-regions that are offset from each other with respect to the axis. The borders of such sub-regions are then perpendicular to the axis. Preferably, the sub-regions have equal height, i.e. equal extension along the axis, and/or are regularly offset. It is further preferred that the offset corresponds to half the height, such that each sub-region lies side-by-side with the next sub-region but one and the two adjacent halves of these two adjoining sub-regions are overlapped by the intermediate sub-region.

Preferably, the axis along which the region of interest is divided into sub-regions is a vertical axis. The sub-regions may then be horizontal stripes of equal height offset from each other by half the height. Vertically dividing the region of interest is particularly suitable to distinguish real obstacles form structures or patterns lying in a horizontal plane such as a road or some other ground. This is because vertically offset sub-regions of the image projection of a horizontal plane correspond to parts of the plane that differ with respect to their distance from the camera and, hence, will result in different TTCs.

For each of the sub-regions of the region of interest of the current image frame, an individual TTC is determined, the TTC being a measure for the duration of time until the moment when the objective content of the sub-region is expected to reach the position of the camera, in particular assuming a constant approach velocity. In order to infer motion from static image frames, at least two image frames have to be taken into account. Hence, determining the TTCs is based not only on the current image frame, but also on at least a preceding image frame or a succeeding image frame. If the method is performed in real-time during continuous acquisition of new image frames, with the current image frame always being the latest image frame available, the respective other image frame of course is a preceding image frame. Also in general the other image frame is preferably a preceding image frame, though the same method may also be executed with a succeeding image frame as the other image frame. The preceding (or succeeding) image frame preferably, though not necessarily, is the image frame directly preceding (or succeeding) the current image frame with respect to the temporal order of the image frames within the sequence of image frames. In general, known methods for determining a Time-To-Contact of an object from successive image frames of that object may be applied.

Determining the TTC does not necessarily mean that for each sub-region a specific TTC value can always be obtained. Determining a TTC value may fail for one or more of the sub-regions, e.g. if a reliability criterion is not fulfilled. Instead of a specific value the determination of a TTC may then return void or some other indicator that no valid TTC value could be determined.

Step B. of the method comprises that one or more classification features are determined based on the TTCs of the sub-regions determined for the current image frame. The classification features are derived from the TTCs, though other parameters can also be taken into account. At least one classification feature may e.g. be the result of a comparison of a respective TTC with a threshold or the result of a comparison of two TTCs with each other. As another example, at least one classification feature may be based on whether for a respective sub-region a TTC value could be determined or not, and/or on the number of sub-regions for which no valid TTC could be determined. While at least one classification feature which is taken into account in the classification is determined based on the TTCs of the sub-regions, not necessarily all such classification features are. Instead, the classification may additionally rely on further classification features which are not, at least not directly, correlated to the TTCs of the sub-regions. Preferred examples of such further classification features are described further below.

Step C. of the method comprises that the obstacle candidate is classified based on the determined one or more classification features. In particular, the classification returns whether the obstacle candidate is valid, i.e. is to be considered a real obstacle, or not. Preferably, there is at least a third possible classification result, such as "unknown", which may indicate that it remains unclear whether the obstacle candidate is valid or not. For example, this may be the case, if any part of the method fails, if a confidence measure of the classification is below a threshold, or if the determined classification features are contradictory or indicate that the data is not sufficiently reliable.

In general, the method for validation of an obstacle candidate can be applied to a single "current" image frame, with only a single other image frame being required for determining the TTCs of the sub-regions from changes between the two image frames. In a preferred embodiment though, step A. is iterated, with, in the first iteration, the current image frame being a first image frame of the sequence of image frames and with, in each subsequent iteration, the current image frame being an image frame succeeding, in particular directly succeeding, the current image frame of the respective previous iteration. In this manner, TTCs of the sub-regions are determined for a plurality of image frames, in particular for each image frame of the sequence of image frames. Then, the determining of one or more classification features in step B. can be, and preferably is, based on averaged TTCs of the sub-regions, the averaged TTCs being obtained for each sub-region by averaging the TTCs of the sub-region over a predetermined number of iterations. The predetermined number of iterations can correspond to the total number of iterations or to a smaller number, for example ten, so as to determine the averaged TTCs as a kind of moving averages. By averaging the TTCs over a plurality of image frames, the TTCs which are prone to high noise due to small changes between successive image frames are advantageously low pass filtered.

According to an advantageous embodiment, the determining of a TTC of a sub-region comprises determining a change of size of the sub-region between the current image frame and the preceding (or succeeding) image frame. Although the image frames are two-dimensional, a change of size of a respective sub-region may be determined with respect to a single dimension only, since changes in one dimension can be sufficient for deducing a TTC. Preferably, the change of size is determined at least for the dimension in which the sub-region has its greatest extension. If the region of interest is divided along a vertical axis into vertically distributed sub-regions, the TTC of a sub-region can in particular be determined based on a change of width (horizontal extension) of the sub-region.

The TTC of a sub-region can e.g. be calculated by the equation $$TTC = \frac{w}{\Delta w} dt, \Delta w = w' - w \tag{1}$$

wherein w is the size (width) of the sub-region in the preceding one of the two image frames, w' is the size (width) of the sub-region in the succeeding one of the two image frames, $\Delta w$ is the change of size (width), and dt is the time step between the two image frames.

If the TTCs are used for validation purposes only, their absolute values might not be important. If the frame rate is constant, the time scale can therefore be normalized by setting dt to 1. As is apparent from equation (1), also the absolute sizes are not important, since the TTC depends on the relative change of size. Therefore, equation (1) could also be written as $$TTC = \frac{1}{\Delta \tilde{w}} \tag{2}$$

wherein $\Delta \tilde{w} = w'/w - 1$ is the relative change of size between the two image frames.

However, for non-constant frame rates the time step dt between successive image frames varies. In such a case it is therefore important not to neglect dt so that TTCs determined for different image frames can directly be compared to each other. Also for averaging TTCs over a series of image frames, the TTCs have to accord to a common scale. If the frame rate is not known or not constant, dt is preferably determined from timestamps that are assigned to the image frames.

While the time step dt may be known, be computed from timestamps of the image frames, or simply be set to 1, for calculating the TTC of a sub-region the size of the sub-region in a respective image frame has to be determined. The size of the sub-region within the current image frame can e.g. be equal to the size of the region of interest which is already determined for the current image frame. Thus, computing the TTC reduces to the task of finding a way to determine the size of the sub-region in the preceding (or succeeding) image frame. On pixel level, this task is equivalent to detecting the amount by which the single pixels spread apart or converge. The movement of pixels representing the same object structure between successive image frames is referred to as "optical flow" in the literature. Computation of a dense optical flow, i.e. computation of the movement of each single pixel of the region of interest or of a sub-region thereof, is computational expensive and thus not suitable for runtime demands on low cost hardware used for embedded systems. Therefore it is preferable to compute the flow only for a small set of interest points inside the sub-regions.

Accordingly, in a preferred embodiment of the invention, the determining of a TTC of a sub-region in particular comprises that interest points of the sub-region are determined, that, for each interest point, a change of position of the interest point between the current image frame and the preceding (or succeeding) image frame is determined, and that the change of size of the sub-region between the current image frame and the preceding (or succeeding) image frame is derived from at least the determined changes of positions of the interest points.

Determining the interest points of a sub-region may comprise selecting, in the current image frame, from a set of interest points those interest points which are contained in the sub-region. It is to be noted that, if the sub-regions overlap, some or even all interest points may be contained in, and hence belong to, more than one sub-region. For example, general interest points can be determined over the entire region of interest. These interest points then form the set of interest points. For determining the TTC of a sub-region of the region of interest based on changes of positions of interest points, those interest points of the set are taken into account which, in the current image frame, are located within that sub-region. Since in successive image frames interest points may enter or leave a sub-region, for different current image frames the same sub-region may contain different interest points. Also the set of interest points which forms the pool from which the interest points of a respective sub-region are taken is not necessarily constant.

The interest points ideally meet the following requirements. To allow for a successful determination of the local optical flow, an interest point's local environment, e.g. defined as a quadratic, or at least rectangular, box of predetermined width and height, should contain an ample amount of texture, in particular a high image gradient, preferably in both dimensions. The interest points should homogenously cover the sub-regions to yield a representative prediction of a sub-region's change of size. And the determination of the interest points shall be fast. For fast determination of the interest points and homogenous coverage of the sub-regions the interest points may be arranged in a predefined grid structure. This, however, may not lead to interest points having significant texture. On the contrary, defining as interest points the points with highest image gradient may fulfil this requirement, but cannot guarantee that the sub-regions are homogenously covered and might also be computationally expensive and, hence, too slow.

According to an embodiment, the set of interest points is obtained in the following manner. In a first image frame of the sequence of image frames, an initial set of interest points is defined. This initial set is preferably based on the points of an equidistant grid applied to at least the region of interest. Then, for each subsequent image frame of the sequence of image frames, the set of interest points is modified based on tracking the interest points of the set through the sequence of image frames, wherein, when the tracking of an interest point leads to an invalid result, the interest point is from then on (i.e. in the image frame for which the invalid result was obtained and in all subsequent image frames) deleted from the set of image points and replaced by a new interest point. In this way, the interest points of the initial set can be determined fast and cover the sub-regions homogenously. But if an interest point turns out not to be useful (any more), it is replaced by a new interest point.

Whether tracking an interest point leads to an invalid result may e.g. depend on comparing the local environment of the interest point at the new position to the local environment of the interest points at the previous position, with the result being invalid if the two environments' similarity is below a certain threshold. Alternatively or additionally, tracking may lead to an invalid result, if for an interest point no new position can be determined or if the local environment of the interest point at the new position is partially located out of the respective image frame. Also, if the distance of an interest point at its new position to the nearest other interest point is below a certain threshold, in particular such that the local environments of these interest points overlap by more than a threshold ratio, one of these interest points, preferably the one having less texture, is deleted.

The new interest point to replace an interest point leading to an invalid result is preferably chosen such that the above mentioned requirements are at least probably better met. In particular, the new interest point can be defined by the following procedure. First, one of the sub-regions is selected, wherein for this selection sub-regions containing fewer interest points are preferred over sub-regions containing more interest points. For example, the sub-region, or one of the sub-regions, containing the fewest interest points can be selected; or the selection is random, though with weighted probabilities such that the probability is greater for sub-regions containing fewer interest points.

After a sub-region is selected, a point located within this sub-region is randomly selected and tested for compliance with one or more predetermined suitability conditions. Preferably, parts of the sub-region that form local environments of other interest points are excluded for the random selection of the new point. The test may further comprise determining an image gradient of the local environment of the new point, e.g. by determining the absolute horizontal and vertical gray-value difference between four corners of the local environment. Meeting the suitability condition may then require that the gradient exceeds a threshold. Another suitability condition may be that the overlap of the new point's local environment and the local environments of existing interest points be below a threshold, so as to achieve a homogenous distribution of interest points.

If the randomly selected point does not comply with the one or more predetermined suitability conditions, the determination of a possible interest point is repeated, i.e. at least the step of randomly selecting a point within the selected sub-region is repeated. If the selection of the sub-region contains random elements, this selection may first be repeated, too. The determination of a possible interest point is repeated until a point does comply with the one or more predetermined suitability conditions, in particular with all of the predetermined suitability conditions. This point is then defined as the new interest point to be inserted into the set of interest points instead of the deleted interest point. Such strategy favors a homogenous distribution of interest points which are at the same time located at image positions with high texture.

According to a further embodiment, the determining of the change of position of an interest point comprises tracking, in particular optically tracking, the interest point through the sequence of image frames up to at least the current (or succeeding) image frame, preferably through the entire sequence of image frames. For tracking an interest point, one or more local environments of the interest point may be taken into account. In particular, based on a local environment of an interest point in an image frame, a template is defined which at least essentially corresponds to the local environment including the interest point, but may be resampled, preferably downsampled, to a desired resolution. In order to track the interest point, the template can then be searched for in subsequent image frames. In a preferred embodiment, two such templates corresponding to local environments having the same interest point as their centers, but different extensions, are determined and used for tracking the interest point in subsequent image frames, with the size of the larger local environment preferably being double the size of the smaller one and the resolution of the larger template preferably being half the resolution of the smaller one such that the two templates have the same number of pixels. Taking two or more local environments of a respective interest point into account allows performing tracking on two or more scales simultaneously, whereby the tracking efficiency and precision can be improved.

In general, tracking of a region or of a point may comprise that, in a first image frame of the image sequence of image frames, at least one template is defined based on the tracked region or on a local environment of the tracked point, i.e. on a region of preferably predetermined size surrounding the tracked point, respectively, and that, in at least one, preferably each, of the subsequent image frames of the sequence of image frames, a region which (at least locally) corresponds best to the at least one template is determined. This region may be used as a basis for a new template which is searched for in a then subsequent image frame etc. Alternatively, the template may remain the same for searching all subsequent image frames.

In contrast to the tracking of the region of interest as described above, the interest points may be tracked only with respect to their positions in the image frames, whereas changes of size are either neglected or, preferably, need not be estimated because they are predetermined based on the change of size of the region of interest which may be obtained from tracking the region of interest. This yields an advantage in runtime and renders tracking less prone to errors and noise, as scale estimation might be challenging for small local environments of the interest points. Preferably, tracking an interest point is based on the Kanade Lucas Tomasi (KLT) methodology and/or employs a Kalman filter to model relative motion of an interest point. In particular, the tracking can be executed according to methods described in European patent application no. 17 182 718.1.

After the changes of positions of the interest points of a sub-region have been determined, the change of size of that sub-region can be derived, in particular algorithmically, e.g. based on a normal equation system, preferably by applying the method of least squares. According to an advantageous embodiment, deriving the change of size of a sub-region comprises that a first center position of the sub-region and a first set of relative coordinates of the interest points of the sub-region, the relative coordinates being defined relative to the first center position, are determined for the current image frame, and that a second center position of the sub-region and a second set of relative coordinates of the interest points of the sub-region, the relative coordinates being defined relative to the second center position, are determined for the preceding (or succeeding) image frame, and that the change of size of the sub-region is derived from at least a relation between the first set of relative coordinates and the second set of relative coordinates. This relation then corresponds to an amount of spread or convergence of the interest points. Therefore, the change of size of the sub-region can efficiently be obtained by comparing the relative coordinates of the interest points in the two image frames. The center positions can for example correspond to the geometric centers of the sub-region or of the interest points of the sub-regions in the two image frames. In particular, the positions of the interest points in the preceding (or succeeding) image frame can be determined, e.g. by tracking the interest points, and the second center position can then be determined based on these determined positions of the interest points, e.g. as their geometric center.

Preferably, before the change of size is derived a reliability criterion is checked so as to evaluate whether a reliable TTC can be determined for the respective sub-region based on the given interest points. For example, determining the TTC of a sub-region may be aborted, if, in the current image frame, the sub-region is out of the image frame for more than a threshold ratio and/or if the number of interest points contained in the sub-region is below a threshold, e.g. less than three. If determining the TTC is aborted, a void value or some other indicator that no TTC value could be determined for this sub-region may be returned. The determined TTC is then considered invalid.

After the TTCs are determined for each of the sub-regions at least for the current image frame (and taking into account at least one preceding or succeeding image frame to obtain motion information), one or more classification features can be determined based on these TTCs. A simple classification feature may be based on a comparison of the TCCs obtained for the different sub-regions. Since a real obstacle is considered to be essentially upright, for a real obstacle the TTCs of all of the sub-regions of the image projection of the obstacle candidate are expectedly at least roughly identical to each other. Hence at least one classification feature can e.g. correspond to a variance of the TTCs of the sub-regions.

Additionally or alternatively, the TTCs of the sub-regions may be compared to a TTC determined for the region of interest as whole. If the obstacle candidate is a real obstacle, the TTCs of the sub-regions are expected to correspond to the TTC of the entire region of interest. Accordingly, in a further embodiment of the invention, the determining of one or more classification features in step B. comprises that, for each sub-region, at least one classification feature is determined which is, or is at least based on, a difference between the determined TTC of the sub-region and a TTC of the entire region of interest determined for the current image frame. Determining the TTC of the entire region of interest preferably comprises that a change of size of the region of interest between the current image frame and the preceding (or succeeding) image frame is determined. Again, it may be sufficient to determine the change of size with respect to a single dimension only, preferably with respect to the horizontal extension (width) of the region of interest. The change of size, from which the TTC can be determined e.g. by equation (1), can in particular be obtained as a result of tracking the region of interest through the sequence of image frames.

Instead of basing the one or more classification features only on TTCs determined for the current image frame, for at least one classification feature the TTCs on which this classification feature is based can be averaged TTCs obtained by averaging determined TTCs over a plurality, in particular a predetermined number, of successive image frames of the sequence of image frames. This can increase robustness of the classification, as noise may be filtered out.

According to an advantageous embodiment, the determining of one or more classification features in step B. comprises that, for each sub-region, a classification feature is determined which is, or is at least based on, the ratio of valid TTCs within the TTCs of the sub-region determined for the current image frame and for a predetermined number of image frames preceding the current image frame. In other words, each sub-region is tested for how many of the last image frames (e.g. the ten last image frames) no valid TTCs could be determined. If for one or more sub-regions the ratio of invalid TTCs is greater than a threshold this may indicate that the obstacle candidate has only little texture which, in turn, may indicate that the obstacle candidate is no real obstacle, but e.g. part of the road and, hence, invalid.

Besides classification features based on the TTCs of the sub-regions of the region of interest, classifying the obstacle candidate can also take into account further classification features that are not based on these TTCs. In particular, step B. may further comprise that at least one further classification feature is determined which is, or is at least based on, one of a TTC of the entire region of interest determined for the current image frame, the size and/or position of the region of interest, and the position of the current image frame within the sequence of image frames. The classifying of the obstacle candidate in step C. can then be based additionally on at least one such further classification feature.

After a set of classification features that are based on the TTCs of the sub-regions (and optionally further classification features that are not based on these TTCs) is determined, the obstacle candidate can be classified. Classification can efficiently be performed e.g. by means of a linear Support Vector Machine (SVM), because the classification then simplifies to a vector multiplication of the SMV's normal vector N with a vector X built from the set of classification features, followed by a comparison to a boundary distance D. In particular, the classification returns that the obstacle candidate is valid if the following condition is met:

$$N^T X > D. \qquad (3)$$

The parameters of the SVM, in particular its normal vector N and the boundary distance D, are preferably predetermined by training the classifier with a multitude of different training data points for each of which the expected classification result is known.

Using a single SVM is generally rather fast, but may not be sufficient for a reliable classification over a wide range of object distances, because larger regions of interest which correspond to closer objects provide higher resolution, contrast and detail as well as larger displacements for the same object approach speed than smaller regions of interest which correspond to more distant objects. It may therefore be useful to have a set of different SVMs from which the SVM best suited for the respective case can be selected.

According to an embodiment, the classifying of the obstacle candidate in step C. comprises the following classifying steps: determining the size of the region of interest, in dependence on the determined size of the region of interest, selecting a Support Vector Machine (SVM) from a predetermined set of different, preferably linear, SVMs obtained by training the SVMs for different respective ranges of the size of the region of interest, and applying the selected SVM to the determined one or more classification features and, if available, to the at least one further classification feature. Instead of using the size of the region of interest as criterion for selecting an SVM from a pre-trained set of SVMs, a different characteristic of the sequence of image frames, which may be derived from a single image frame such as the current image frame or from the set as a whole, can alternatively be used. This characteristic preferably at least indirectly relates to the distance of the obstacle candidate from the camera or host object. For example the SVMs forming the set can alternatively be trained for different ranges of the TTC of the entire region of interest. In this case, selecting from these SVMs the SVM to be applied to the determined classification features requires determining the actual TTC of the entire region of interest and is then done in dependence on this determined TTC.

Furthermore, before these classifying steps are executed, a pre-classification can be executed, preferably based on the same classification features, to sort out cases which either apparently would not allow proper classification or can directly be classified without the use of an SVM classifier. In such cases the further classifying can be aborted and the obstacle candidate is either classified as non-validatable or unknown, or directly classified as valid or invalid, respectively. Accordingly, in a further embodiment of the invention, the classifying of the obstacle candidate in step C. comprises a pre-classification executed before the classifying steps, wherein the pre-classification comprises determining whether at least one of the classification features (optionally including the further classification features, if available) meets a respective abort condition, and further comprises that, if a respective abort condition is met, the above classifying steps are omitted and the obstacle candidate is classified based on the abort condition instead. If, on the contrary, none of the respective abort conditions is met, the classifying steps are executed.

The respective abort condition for a classification feature may e.g. be that the classification feature exceeds a respective threshold. For example, if the method is used in the context of collision prevention, the obstacle candidate can be classified as unknown, if the TTC of the region of interest and/or any one of the TTCs of the sub-regions exceeds a threshold. In this manner, classification is aborted in cases where the obstacle candidate is too far away to be considered critical. As another example, the obstacle candidate can be classified as unknown, if for the current image frame the region of interest is found to be located partially out of the image frame for more than a threshold ratio, since features from only partially visible sub-regions may not be representative. Furthermore, if the number of sub-regions for which no valid TTC could be determined exceeds a threshold, the obstacle candidate may directly be classified as invalid (i.e. not a real upright obstacle), since real objects tend to yield a valid TTC for almost all sub-regions; alternatively, in such cases the obstacle candidate may also be classified as unknown.

The objective of the invention is furthermore solved by a computer program product in accordance with claim 15 and, in particular, by a computer program product with a computer program which has software means for carrying out a method in accordance with at least one of the embodiments described above, if the computer program is executed in a computing device. Due to the preferably low complexity of the calculations during execution of the method, the computer program may especially be suited to be executed on a microcontroller or an embedded system, e.g. of the camera which is used for capturing the image frames of the sequence of image frames.

Further features and advantages will appear more clearly on a reading of the following detailed description of the preferred embodiment, which is given by way of non-limiting example only and with reference to the accompanying drawings.

BRIEF DESCRIPTION OF DRAWINGS

Further details will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
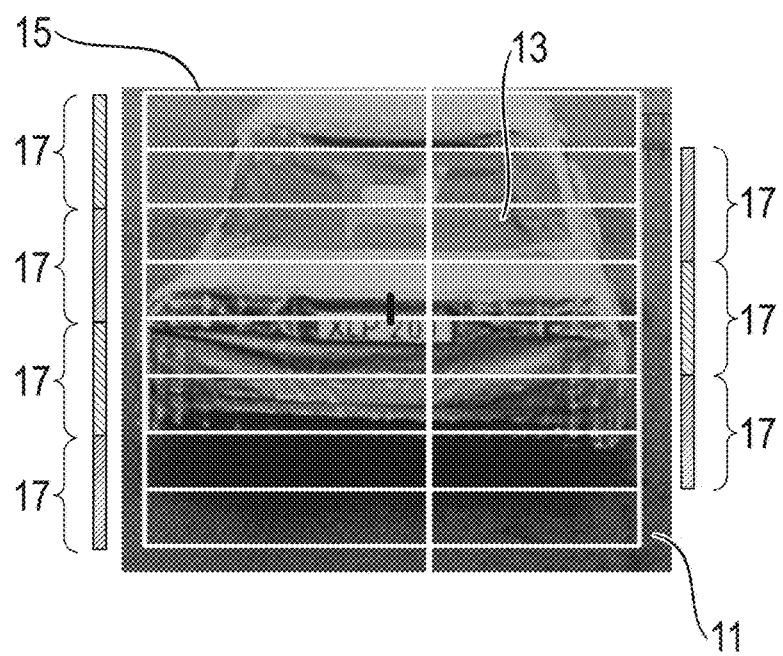
FIG. 1 shows a detail of an image frame in which a region of interest, which contains the image projection of an obstacle candidate to be validated by an embodiment of the inventive method, as well as sub-regions of the region of interest are outlined.

In FIG. 1 a detail of an image frame 11 of a sequence of image frames captured by a camera mounted on a host vehicle is shown. The detail includes an obstacle candidate 13 that has been identified within the image frame 11 by any suitable method, e.g. by pattern recognition. The obstacle candidate 13 is considered to be an image projection of a real object that may be an obstacle to the host vehicle. In the present example, the object is a car in front of the camera. Whether the obstacle candidate 13 is a real obstacle or just part of the background or road, is validated by the method according to the invention by which the obstacle candidate 13 is classified as either valid or invalid. Moreover, the obstacle candidate 13 can also be classified as unknown, if no conclusion can reliably be reached. The validation of the obstacle candidate serves to support the decision for potential evasive maneuvers in successive higher level logics of an advanced driver assistance system.

The method for validation of the obstacle candidate 13 comprises that a region of interest 15 is determined in the image frame 11. This region of interest 15 at least essentially corresponds to the image projection of the obstacle candidate 13 in the image frame 11 and is defined by a bounding box, which is outlined in FIG. 1. The region of interest 15 is tracked through successive image frames 11 of the sequence of image frames 11 by applying the Kanade Lucas Tomasi (KLT) methodology and employing a Kalman filter to model relative motion of the obstacle candidate 13 in a manner as described in European patent application no. 17 182 718.1. As a result of this tracking, the position and size, in particular the width, of the region of interest 15 can be determined for each image frame 11. From the change of width of the region of interest 15 between two successive image frames 11 a Time-To-Contact (TTC) of the region of interest 15, i.e. an overall TTC of the obstacle candidate 13, is determined in accordance with equation (1), wherein dt is the time interval between the two image frames 11 and can be determined as the inverse of the (nominal) frame rate or from timestamps of the image frames 11.

To validate whether the TTC of the region of interest 15 relates to a real obstacle, the region of interest 15 is divided along the vertical axis into seven sub-regions 17 of equal height, the height of each sub-region 17 being a quarter of the total height of the region of interest 15. The sub-regions 17 are offset to each other along the vertical axis by half their height so that they overlap and each point of the region of interest 15 (with the exception of points located in the upper half of the topmost sub-region 17 or in the lower half of the bottommost sub-region 17) is contained within two of the sub-regions 17 as indicated in FIG. 1 by the vertical bars drawn to the left and to the right of the image frame 11. The validation of the obstacle candidate 13 is based on the assumption that a real obstacle is essentially upright with respect to the line of sight of the camera. If this is the case, TTCs individually determined for each sub-region 17 are expected to at least approximately correspond to each other as well as to the TTC determined for the region of interest 15 as a whole.

In order to determine TTCs of all sub-regions 17, for each of the sub-regions 17 a change of width is determined. To this end, an initial set of interest points 19 located within the region of interest 15 is defined by arranging points equidistantly in a 6 by 6 grid filling the region of interest 15 (cf. FIG. 2, in which only a few of the interest points 19 are actually indicated). Each interest points 19 is surrounded by a local environment 21 of square form, with the interest point 19 being located in the center thereof. The local environments 21 have heights and widths that are the sixth of the region of interest's 15 height and width so that the local environments 21 initially cover the entire region of interest 15 without overlap. Each interest point 19 is assigned to all sub-regions 17 it is contained in, i.e. in the present example each interest point 19 is assigned to two sub-regions 17.

Figure 3:
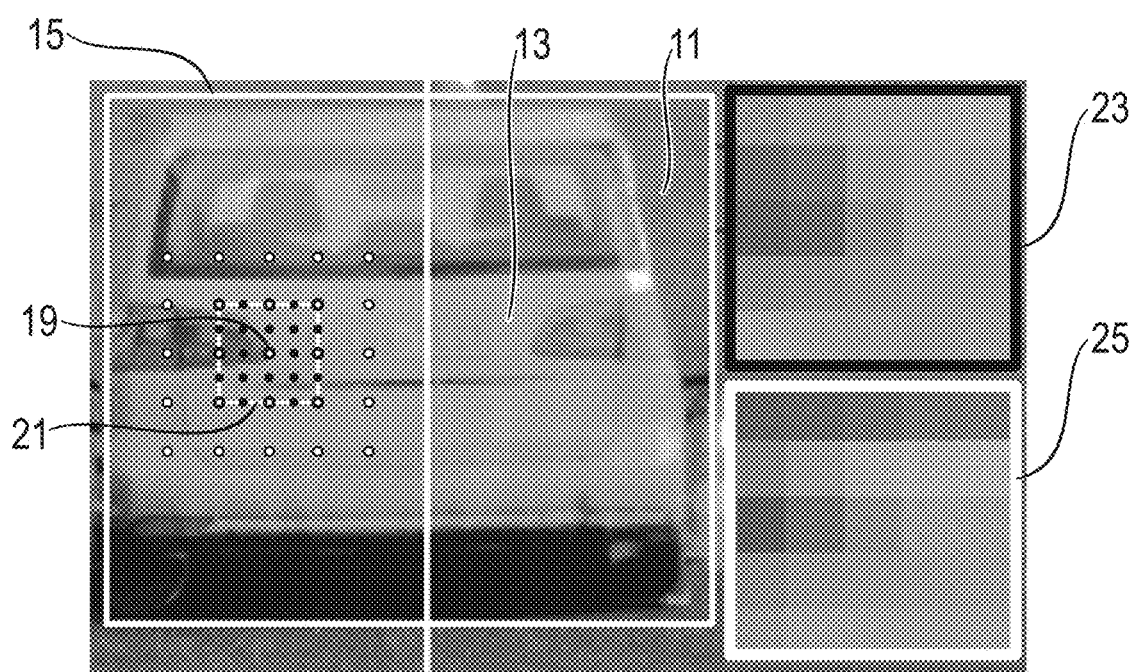
FIG. 3 shows a detail of one the image frames shown in FIG. 2 in which the region of interest is outlined and point grids of two tracking templates are indicated, the templates being shown also separately in enlarged form on the right side of FIG. 3.

Similarly to the region of interest 15 as a whole, the interest points 19 are tracked through the sequence of image frames 11 by the same general methodology. However, while for tracking the region of interest 15 its content in the first image frame 11 can be used as a template to be searched for in subsequent image frames 11, the interest points 19 by themselves cannot be used as a template, as a template cannot be defined by a single pixel. Therefore, for tracking the interest points 19, respective templates are defined based on surroundings, such as the local environments 21, of the interest points 19. For each interest points 19, a smaller template 23 and a larger template 25 are defined (cf. FIG. 3). The smaller template 23 is based on a 5 by 5 point grid the corner points of which are located at the corners of the local environment 21 of the interest point 19, whereas the larger template 25 is based on a 5 by 5 point grid of twice the height and twice the width centered at the interest point 19. Other, in particular finer, point grids, such as e.g. a 9 by 9 point grid, can alternatively be used so as to extract more information. The templates 23, 25 are determined by resampling the region of the image frame 11 that is overlaid with the respective point grid according to this point grid (cf. FIG. 3 on the right). Tracking an interest point 19 then comprises searching in a succeeding image frame 11 a point whose surroundings correspond to both templates 23, 25. In this manner, tracking is performed on two scales at once.

Another difference to the tracking of the entire region of interest 15 is that the interest points 19 are only tracked for changes of position, but not for changes of width. The change of width is therefore no value to be estimated by the tracking algorithm, but is input as a predetermined parameter. Simply put, the templates 23, 25 are scaled according to the predetermined change of width before the current image frame 11 is searched for them. The predetermined change of width corresponds to the change of width of the region of interest 15 which is obtained as a result of tracking the region of interest 15.

Figure 2:
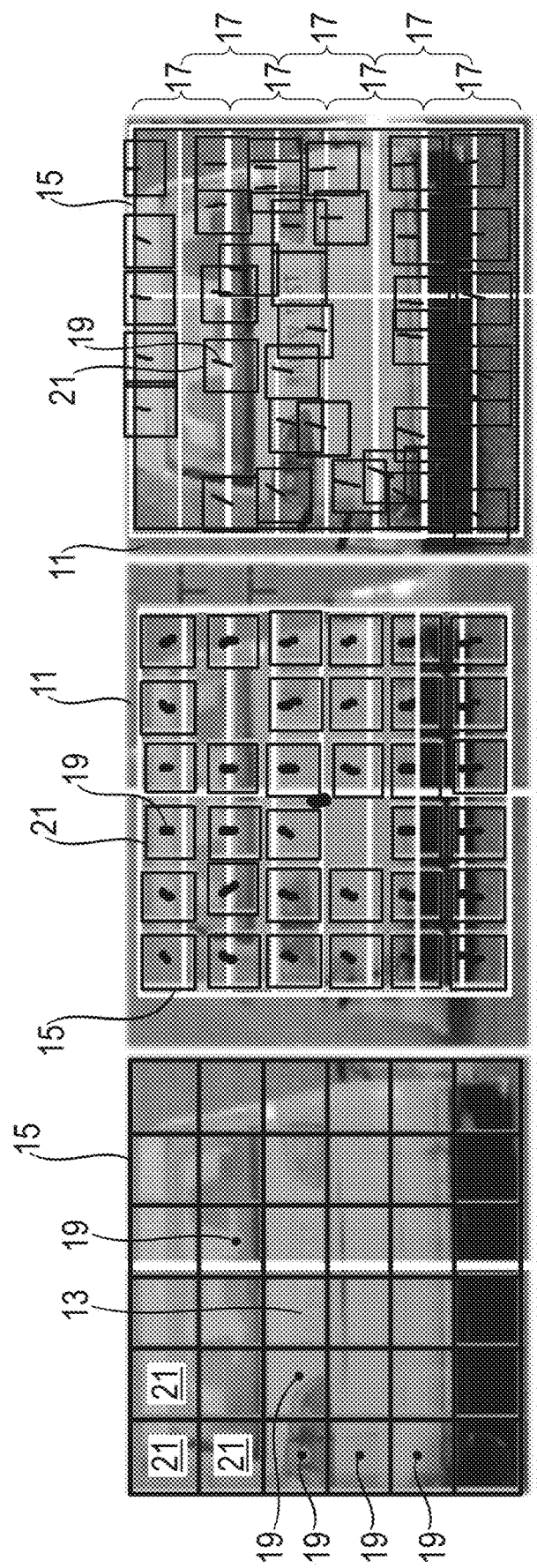
FIG. 2 shows details of three image frames of a sequence of image frames in each of which a region of interest, which contains the image projection of an obstacle candidate to be validated by an embodiment of the inventive method, as well as local environments of tracked interest points are outlined.

The tracking of the interest points 19 is visualized in the center and right image frames 11 shown in FIG. 2, in which short tracks mark the differences between the initial positions of the interest points 19 and their positions in the current image frame 11 as determined by the tracking. The local environments 21 shown in these two image frames 11 are defined with respect to the current positions of the tracked interest points 19.

If tracking of an interest point 19 fails—especially because no new position can be determined the surroundings of which are sufficiently similar to the templates 23, 25 or because the local environment 21 of the interest point 19 is partially out of the image frame 11—or if at the new position the local environment 21 of the interest point 19 overlaps too much with the local environment 21 of another interest point 19, the interest point 19 is deleted and replaced by a newly determined interest point 19. Determining the new interest point 19 is done by selecting a sub-region 17, wherein sub-regions 17 containing only a small number of interest points 19 are preferred over those having many interest points 19, and by randomly placing the new interest point 19 in the selected sub-region 17, though the new interest point 19 is randomly repositioned within the selected sub-region 17, as long as the local environment 21 of the new interest point 19 overlaps too much with local environments 21 of other interest points 19 or the absolute horizontal and vertical gray-value difference between the four corners of the local environment 21 of the new interest point 19 is below a threshold.

Based on tracking the interest points 19, the TTC of a sub-region 17 is derived from the spread (or convergence) of the interest points 19 contained in this sub-region 17. However, a valid TTC value is only calculated, if in the current image frame 11 the sub-region 17 is not out of the image frame 11 for more than a threshold ratio and if the sub-region contains at least three interest points 19. Otherwise determining the TTC returns invalid. In order to calculate the TTC of a sub-region 17 with index j from two image frames 11, in the preceding one of the image frames 11 a first center position $x_j$, $y_j$ of the sub-region 17 is determined and the coordinates $x_i$, $y_i$, of the interest points 19 of the sub-region 17 ($i=1, \ldots, N_j$, with $N_j$ being the number of interest points 19 contained in the sub-region 17) are converted to relative coordinates $a_i = x_i - x_j$, $b_i = y_i - y_j$. Correspondingly, in the succeeding one of the image frames 11 a second center position $x'_j$, $y'_j$ of the sub-region 17 is determined, in particular based on the positions of the interest points 19 of the sub-region 17 in this image frame 11 which have been determined for example by tracking, and the coordinates $x'_i$, $y'_i$ of the interest points 19 of the sub-region 17 are converted to relative coordinates $a'_i = x'_i - x'_j$, $b'_i = y'_i - y'_j$. The relative coordinates in the one image frame 11 and the relative coordinates in the other image frame 11 are then related to one another via the ratio of the old width $w_j$ and the new width $w'_j$ of the sub-section 17 as follows $$\begin{bmatrix} a'_i \\ b'_i \end{bmatrix} = \frac{w'_j}{w_j} \begin{bmatrix} a_i \\ b_i \end{bmatrix} \Leftrightarrow \begin{bmatrix} x'_i \\ y'_i \end{bmatrix} = \begin{bmatrix} w'_j \frac{a_i}{w_j} + x'_j \\ w'_j \frac{b_i}{w_j} + y'_j \end{bmatrix}. \quad (4)$$

Collecting this relation for all interest points 19 in a common system and splitting the parameters that are to be estimated in a separate vector yields the following normal equation system $$\begin{bmatrix} \vdots \\ x'_i \\ y'_i \\ \vdots \end{bmatrix} = \begin{bmatrix} \frac{a_i}{w_i} & 1 & 0 \\ \frac{b_i}{w_i} & 0 & 1 \end{bmatrix} \begin{bmatrix} w'_j \\ x'_j \\ y'_j \end{bmatrix}, \quad (5)$$

with $$l = \begin{bmatrix} \vdots \\ x'_i \\ y'_i \\ \vdots \end{bmatrix}, \quad A = \begin{bmatrix} \frac{a_i}{w_i} & 1 & 0 \\ \frac{b_i}{w_i} & 0 & 1 \end{bmatrix}, \quad p = \begin{bmatrix} w'_j \\ x'_j \\ y'_j \end{bmatrix}. \quad (6)$$

Equation (5) can be written as $$p (A^T A)^{-1} A^T l \quad (7)$$

and solved via least squares. From the such-estimated new width $w'_j$, the old width $w_j$ and the time difference dt between the two image frames 11, the $TTC_j$ of a sub-region 17 then follows as $$TTC_j = \frac{w_j}{w'_j - w_j} dt. \quad (8)$$

Figure 4:
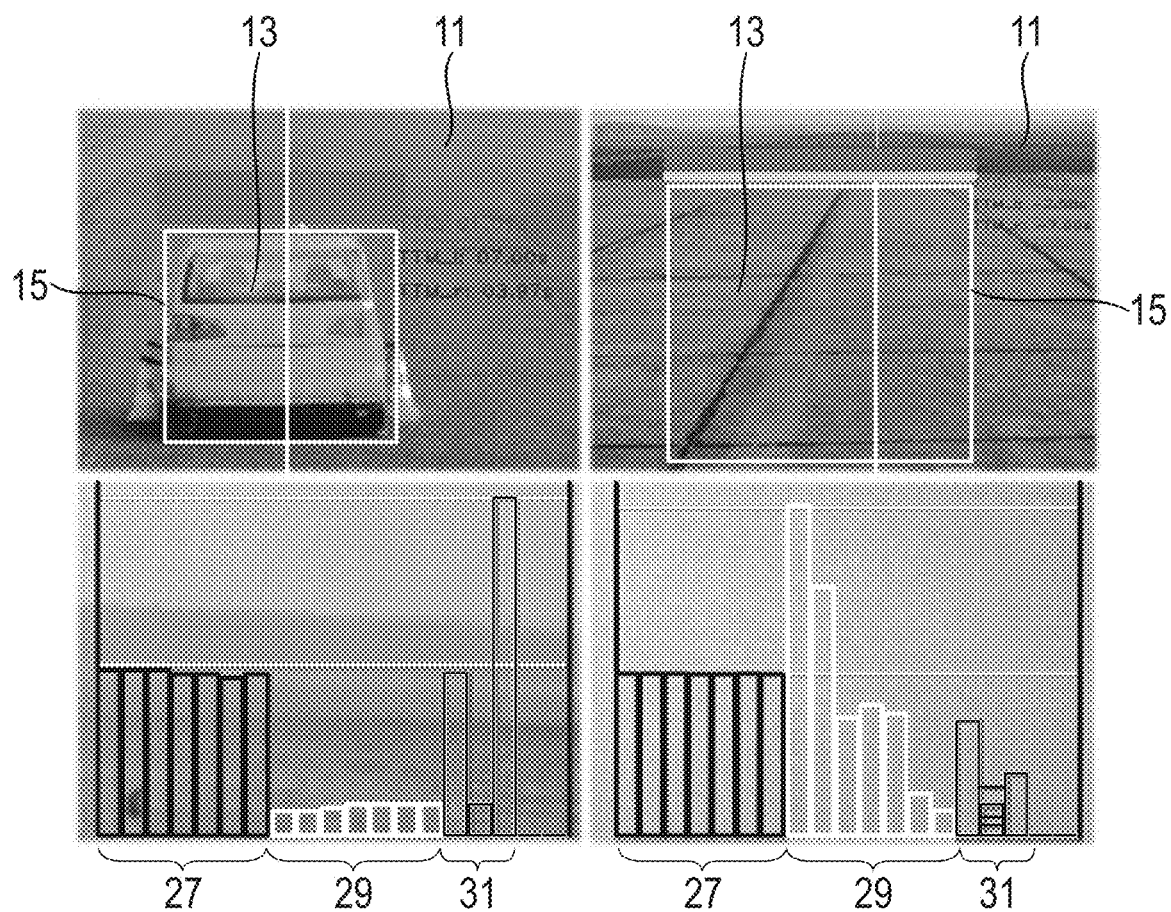
FIG. 4 shows two image frames in each of which a region of interest, which contains the image projection of an obstacle candidate to be validated by an embodiment of the inventive method, is outlined, wherein in the left image frame the obstacle candidate is valid and in the right image frame the obstacle candidate is invalid, and wherein below each image frame a barplot is shown which indicates values of classification features determined for the respective obstacle candidate.

Based on the TTCs of all sub-regions 17, the TTC of the entire region of interest 15 and further parameters, a set of classification features is determined. FIG. 4 shows two image frames 11 (top left and top right, respectively) with outlined regions of interest 15, and two barplots (bottom left and bottom right, respectively) illustrating the resulting classification features. In the left image frame 11 the obstacle candidate 13 is a vehicle and, hence, a real obstacle, whereas in the right image frame 11 the obstacle candidate 13 is part of the road and, hence, invalid.

A first feature block 27, or classification feature 27, comprises for each sub-region 17 one classification feature which is the ratio of how often a valid TTC was computed for the respective sub-region 17 in the last ten image frames 11 (or less image frames 11 if the tracking started less than ten image frames 11 before the current image frame 11). The resulting values of the seven classification features of the first feature block 27 are indicated by the seven leftmost bars in each of the two barplots shown at the bottom of FIG. 4. For both image frames 11 shown in FIG. 4, the classification features of the first feature block 27 are almost identical. This is because, even though the obstacle candidate 13 on the right is invalid, it has some texture which allows calculating valid TTCs. Hence, for the given example, the first feature block 27 is not sufficient for classifying the respective obstacle candidate 13.

A second feature block 29, or classification feature 29, comprises for each sub-region 17 one classification feature which is the difference between the TTC of the respective sub-region 17 and the TTC of the region of interest 15, both of these two TTCs being low pass filtered by being averaged over the valid TTC computations in the last ten image frames 11 (or less image frames 11 if the tracking started less than ten image frames 11 before the current image frame 11). As can be seen from the barplots in FIG. 4, the classification features of the second feature block 29 (the eighth to fourteenth bars from the left) are rather small and very similar to each other for the valid obstacle candidate 13 (left image frame 11) and are rather large and differ significantly for the invalid obstacle candidate 13 (right image frame 11).

A third feature block 31, or classification feature 31, comprises further classification features which are meant to support the classification process by introducing global information not directly related to the sub-regions 17. A first classification feature of the third feature block 31 (third bar from the right) simply corresponds to the TTC of the region of interest 15. Based on this classification feature the quality of the TTCs of the sub-regions 17 can be estimated, as this quality may depend on the amount of change in successive image frames 11 which in turn depends on the overall approach speed. A second classification feature of the third feature block 31 (second bar from the right) corresponds to the width of the region of interest 15. This classification feature, too, can help estimating the quality of the TTCs of the sub-regions 17, as a larger region of interest 15 results in higher resolution also of the sub-regions 17. A third classification feature of the third feature block 31 (rightmost bar) corresponds to the duration of tracking so far. If the region of interest 15 and/or the interest points 19 have been tracked only for a few image frames 11, the effects of low pass filtering the TTCs may be different than for a greater number of image frames 11. To prevent the classification to be biased by long tracks, this classification feature may be clipped, e.g. to twenty image frames 11.

Based on the determined classification features, the respective obstacle candidate 13 is then classified by means of a linear Support Vector Machine (SVM). This classification, however, is preceded by a pre-classification to sort out degenerated cases which might prevent proper further classification or do not need to be further classified, since a result can directly be obtained. In particular, the obstacle candidate 13 is directly classified as unknown, if the TTC of the region of interest 15 exceeds a threshold or if the region of interest 15 is out of the image frame 11 for more than a threshold ratio. Furthermore, the obstacle candidate 13 is directly classified as invalid (not upright), if the number of sub-regions 17 for which no valid TTC could be determined exceeds a threshold.

If by the pre-classification the obstacle candidate 13 is directly classified, the classifying is aborted. Otherwise, the main classification steps are executed. These steps comprise selecting an SVM from a set of trained SVM in dependence on the width of the region of interest 15 and classifying the obstacle candidate by applying the selected SVM to the determined classification features. For example, a set of four different SVMs can be pre-trained for four consecutive ranges of the width of the region of interest 15 such that the SVMs best adapted to a respective obstacle candidate 13 can be selected by comparing the width of the determined region of interest 15 with three different thresholds (at most). Classifying the obstacle candidate 13 with the selected SVM then returns whether the obstacle candidate 13 is valid, i.e. to be considered a real obstacle, or not.

While this invention has been described in terms of the preferred embodiments thereof, it is not intended to be so limited, but rather only to the extent set forth in the claims that follow.

We claim:

1. A method for validation of an obstacle candidate identified within a sequence of image frames, the method comprising the following steps:
   A) for a current image frame of the sequence of image frames:
      determining within the current image frame a region of interest representing the obstacle candidate;
      dividing the region of interest into sub-regions; and
      for each sub-region, determining a Time-To-Contact (TTC) based on at least the current image frame and a preceding or succeeding image frame of the sequence of image frames;
   B) determining one or more classification features based on the TTCs of the sub-regions determined for the current image frame; and
   C) classifying the obstacle candidate based on the determined one or more classification features, as to whether the obstacle candidate is valid, not valid, or validity of the obstacle candidate is unclear.

2. The method in accordance with claim 1, wherein:
   the step A) is iterated, with, in a first iteration, the current image frame being a first image frame of the sequence of image frames and with, in each subsequent iteration, the current image frame being an image frame succeeding the current image frame of a respective previous iteration; and
   the step B) is based on averaged TTCs of the sub-regions, the averaged TTCs being obtained for each sub-region by averaging the TTCs of the sub-region over a pre-determined number of iterations.

3. The method in accordance with claim 1, wherein determining of the region of interest comprises tracking the region of interest representing the obstacle candidate through the sequence of image frames up to at least the current frame.

4. The method in accordance with claim 1, wherein dividing of the region of interest comprises dividing the region of interest along a vertical axis into a predetermined number of sub-regions of equal width which are regularly offset from each other with mutual overlap.

5. The method in accordance with claim 1, wherein determining the TTC of a sub-region comprises:
determining a change of size of the sub-region between the current image frame and the preceding or succeeding image frame;
wherein step of the determining the TTC of a sub-region comprises
determining interest points of the sub-region;
for each interest point, determining a change of position of the interest point between the current image frame and the preceding or succeeding image frame; and
deriving the change of size of the sub-region between the current image frame and the preceding or succeeding image frame from at least the determined changes of positions of the interest points.

6. The method in accordance with claim 5,
wherein determining of interest points of a sub-region comprises selecting, in the current image frame, from a set of interest points those interest points that are contained in the sub-region; and
wherein the set of interest points is obtained by:
in a first image frame of the sequence of image frames, defining an initial set of interest points based on the points of an equidistant grid applied to the region of interest;
for each subsequent image frame of the sequence of image frames, modifying the set of interest points based on tracking the interest points through the sequence of image frames; and
when the tracking an interest point leads to an invalid result, deleting the interest point from the set of interest points and replacing the deleted interest point with a new interest point.

7. The method in accordance with claim 6, wherein the new interest point is defined by:
selecting one of the sub-regions, preferring those containing fewer interest points over those containing more interest points;
randomly selecting a point of the sub-region;
if the point does not comply with one or more predetermined suitability conditions, repeating the steps A), B), or C) until the point does comply with the one or more predetermined suitability conditions; and
defining the last selected point as the new interest point.

8. The method in accordance with claim 5, wherein the step of determining of the change of position an interest point comprises tracking the interest point through the sequence of image frames up to at least the current or succeeding image frame.

9. The method in accordance with claim 5, wherein the step of deriving of the change of size a sub-region comprises:
determining for the current image frame a first center position of the sub-region and a first set of relative coordinates of the interest points of the sub-region, the relative coordinates being defined relative to the first center position;
determining for the preceding or succeeding image frame a second center position of the sub-region and a second set of relative coordinates of the interest points of the sub-region, the relative coordinates being defined relative to the second center position; and
deriving the change of size of the sub-region from at least a relation between the first set of relative coordinates and the second set of relative coordinates.

10. The method in accordance with claim 6, wherein the step of tracking a region or a point comprises:
in a first image frame of the sequence of image frames, defining at least one template based on the tracked region or on a region surrounding the tracked point, respectively; and
in at least one of the subsequent image frames of the sequence of image frames, determining a region which corresponds best to the at least one template.

11. The method in accordance with claim 1, wherein the step of determining of one or more classification features in step B) comprises:
determining, for each sub-region, at least one classification feature that based on, a difference between the determined TTC of the sub-region and a TTC of an entire region of interest determined for the current image frame; and
the step of determining the TTC of the entire region of interest comprises determining a change of size of the region of interest between the current image frame and the preceding or succeeding image frame.

12. The method in accordance with claim 1, wherein the said determining a Time-To-Contract (TTC) in step A, comprises evaluating whether a TTC can be validly determined for the respective sub-region, and wherein the step of determining one or more classification features in step B) comprises determining, for each sub-region, a classification feature that is based on a ratio of valid TTCs within the TTCs of the sub-region determined for the current image frame and for a predetermined number of image frames preceding the current image frame.

13. The method in accordance with claim 1, wherein:
step B) further comprises:
determining at least one further classification feature based on one or more of:
a TTC of an entire region of interest determined for the current image frame;
a size or a position of the region of interest; and
the position of the current image frame within the sequence of image frames; and
the classifying of the obstacle candidate in step C) is additionally based on the determined at least one further classification feature.

14. The method in accordance with claim 1,
wherein the step of classifying of the obstacle candidate in step C) comprises:
after pre-classifying by:
determining that at least one of the classification features meets a respective abort condition if at least one of the classification features exceeds a respective threshold;
in response to meeting the respective abort condition, classifying the obstacle candidate based on the abort condition; and
refraining from carrying out the steps of:
determining a characteristic of the sequence of image frames corresponding to a size of the region of interest or a TTC of the entire region of interest;
in dependence on the determined characteristic, selecting a Support Vector Machine (SVM) from a predetermined set of different SVMs obtained by training the SVMs for different respective ranges of the characteristic; and
applying the selected SVM to the determined one or more classification features.

15. A non-transitory computer-readable storage media comprising instructions that when executed by one or more processors in a computing device configures the one or more processors to validate an obstacle candidate identified within a sequence of image frames by performing the following steps:
- A) for a current image frame of the sequence of image frames:
  - determining within the current image frame a region of interest representing the obstacle candidate;
  - dividing the region of interest into sub-regions; and
  - for each sub-region, determining a Time-To-Contact (TTC) based on at least the current image frame and a preceding or succeeding image frame of the sequence of image frames;
- B) determining one or more classification features based on the TTCs of the sub-regions determined for the current image frame; and
- C) classifying the obstacle candidate based on the determined one or more classification features, as to whether the obstacle candidate is valid, not valid, or validity of the obstacle candidate is unclear.

16. The non-transitory computer-readable storage media in accordance with claim 15, wherein:
the step A) is iterated, with, in the first iteration, the current image frame being a first image frame of the sequence of image frames and with, in each subsequent iteration, the current image frame being an image frame succeeding the current image frame of the respective previous iteration; and
the step B) is based on averaged TTCs of the sub-regions, the averaged TTCs being obtained for each sub-region by averaging the TTCs of the sub-region over a predetermined number of iterations.

17. The non-transitory computer-readable storage media in accordance with claim 15, wherein determining of the region of interest comprises tracking the region of interest representing the obstacle candidate through the sequence of image frames up to at least the current frame.

18. The non-transitory computer-readable storage media in accordance with claim 15, wherein dividing of the region of interest comprises dividing the region of interest along a vertical axis into a predetermined number of sub-regions of equal width which are regularly offset from each other with mutual overlap.

19. The non-transitory computer-readable storage media in accordance with claim 15, wherein determining the TTC of a sub-region comprises:
determining a change of size of the sub-region between the current image frame and the preceding or succeeding image frame;
wherein step of the determining the TTC of a sub-region comprises determining interest points of the sub-region;
for each interest point, determining a change of position of the interest point between the current image frame and the preceding or succeeding image frame; and
deriving the change of size of the sub-region between the current image frame and the preceding or succeeding image frame from at least the determined changes of positions of the interest points.

20. The non-transitory computer-readable storage media in accordance with claim 19, wherein determining of interest points of a sub-region comprises:
selecting, in the current image frame, from a set of interest points those interest points that are contained in the sub-region;
wherein the set of interest points is obtained by:
in a first image frame of the sequence of image frames, defining an initial set of interest points based on the points of an equidistant grid applied to the region of interest; and
for each subsequent image frame of the sequence of image frames, modifying the set of interest points based on tracking the interest points through the sequence of image frames; and
when the tracking an interest point leads to an invalid result, deleting the interest point from the set of interest points and replacing the deleted interest point with a new interest point.

\* \* \* \* \*